Dec. 6, 1938.                    C. H. KIRBY                    2,139,592
                          SHOCK ABSORBER FOR VEHICLES
                          Filed Sept. 5, 1936          3 Sheets-Sheet 1
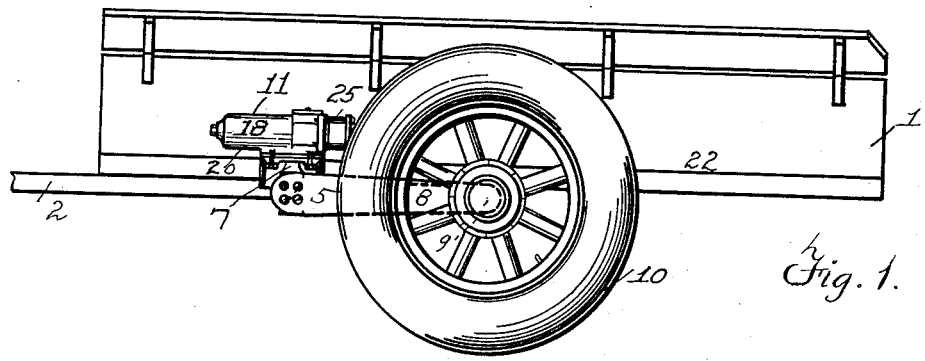
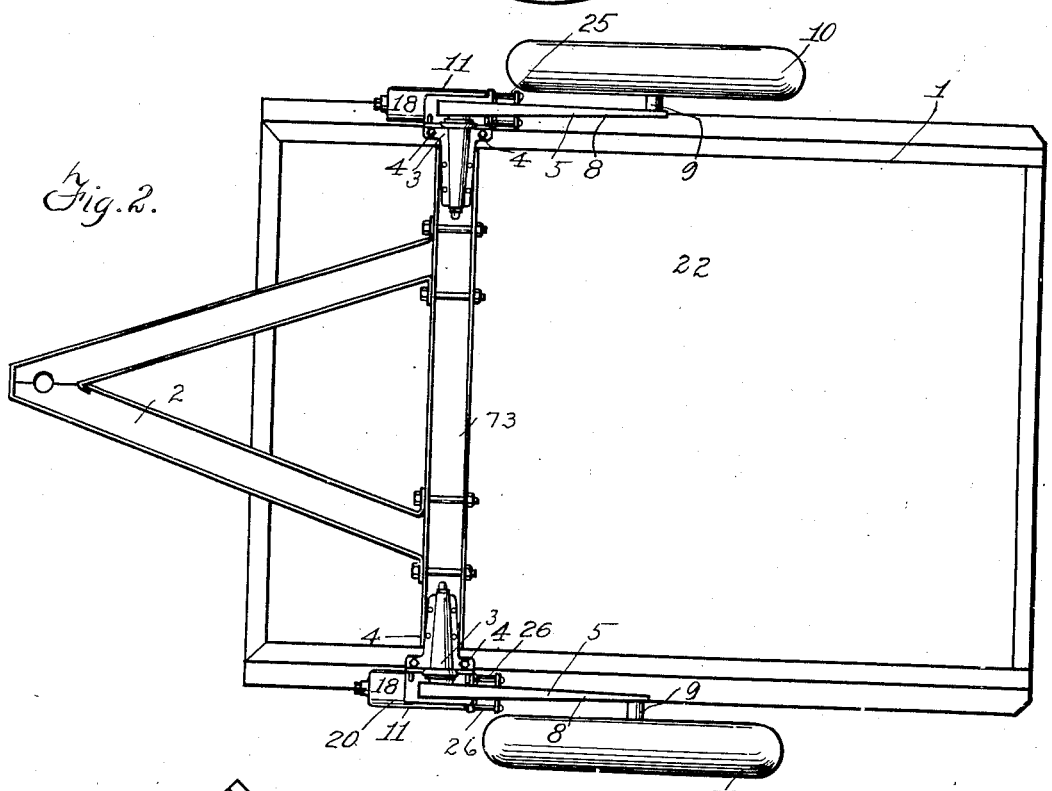
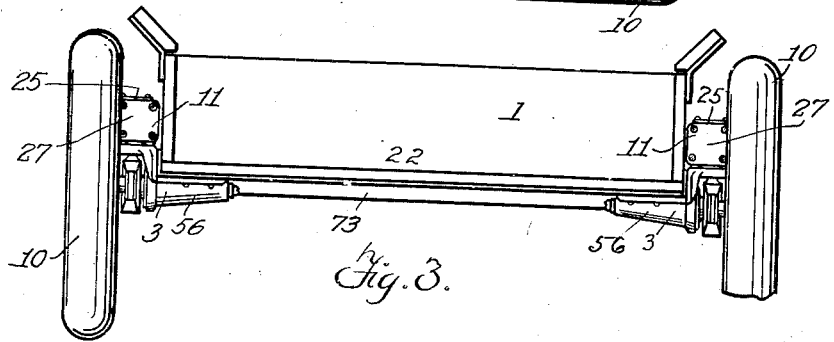
INVENTOR.
CHARLES H. KIRBY
BY
        ATTORNEYS.
WITNESS:
John S. Braddock Dec. 6, 1938.  C. H. KIRBY  2,139,592
SHOCK ABSORBER FOR VEHICLES
Filed Sept. 5, 1936   3 Sheets-Sheet 2

INVENTOR.
CHARLES H. KIRBY.
BY Rice and Rice
ATTORNEYS.

WITNESS:
John S. Braddock

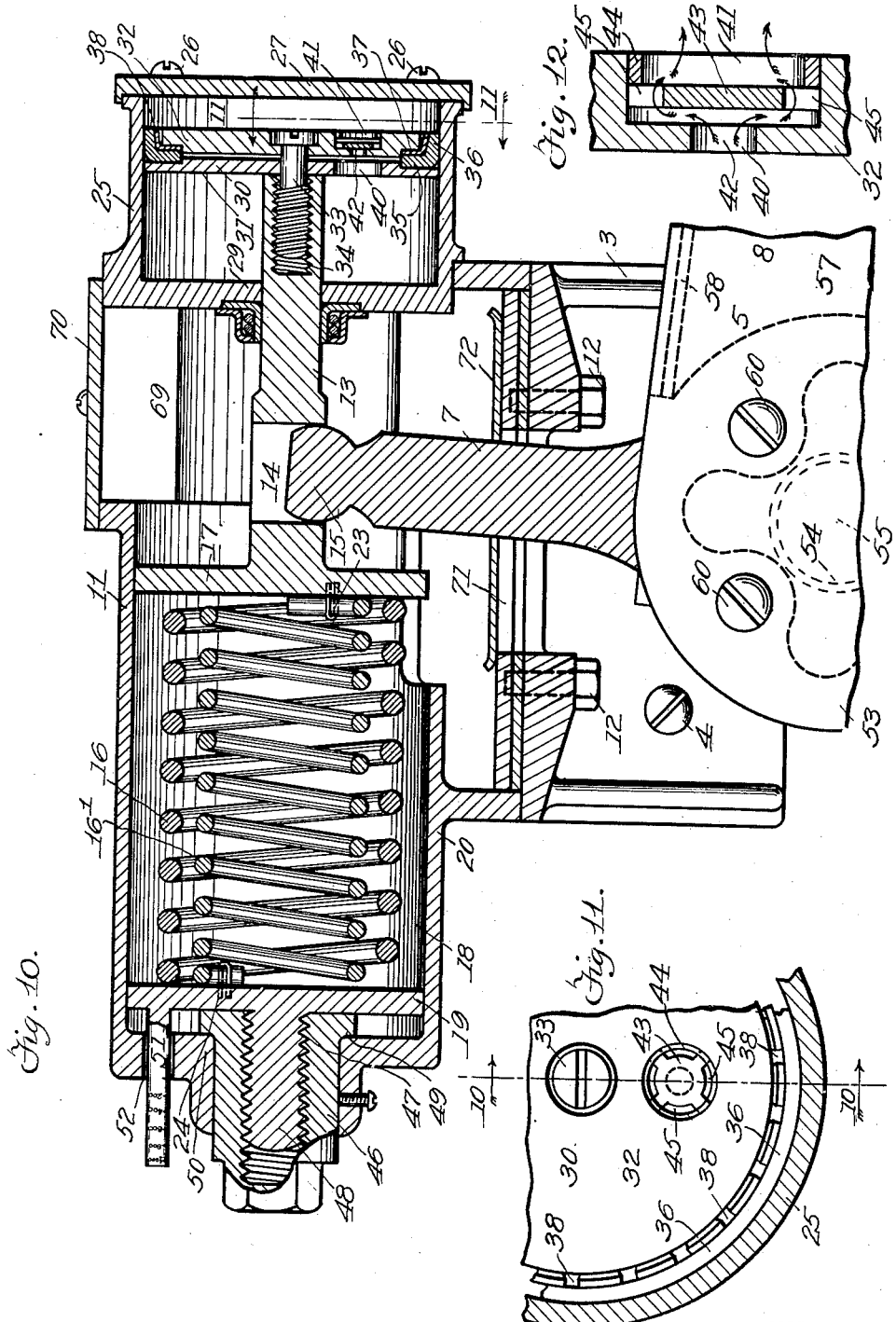

Patented Dec. 6, 1938

2,139,592

UNITED STATES PATENT OFFICE 2,139,592

SHOCK ABSORBER FOR VEHICLES

Charles H. Kirby, Flint, Mich.

Application September 5, 1936, Serial No. 99,522

9 Claims. (Cl. 267—20)

The present invention relates to vehicle springs and shock absorbers; and its object is, generally, to provide a device of that character improved in respects hereinafter appearing; and more particularly, to provide such a device whereby the side sway or lateral rocking and lateral horizontal movement of the vehicle's body is obviated or minimized; and further, to provide indepndently operating devices of that character at the opposite side respectively of the vehicle; and further, to provide such devices readily and detachably mounted; and further, to provide such a device having improved shock-cushioning means; and further, to provide such devices so mounted on the vehicle as to provide a low center gravity therefor; and further, to provide such a device having adjustable means to vary the road clearance or the distance between the vehicle body and the road.

These and any other and more specific objects hereinafter appearing are attained by, and the invention finds preferable embodiment in, the illustrative structure and mechanism particularly described in the body of this specification and illustrated by the accompanying drawings, in which:

Figure 1 is a left-hand side view of a wheeled vehicle to which my shock absorber is applied;

Figure 2 is a bottom plan view thereof;

Figure 3 is a rear view of the same;

Figure 10 is an enlarged side view of portions of the same, similar to Figure 4 and partially sectioned on the same vertical longitudinal plane and line 10—10 of Figure 11, and illustrating a somewhat modified construction;

Figure 11 is a fragmentary sectional view of the same taken on line 11—11 of Figure 10;

Figure 12 is an enlarged sectional view of valve parts taken on line 10—10 of Figure 11.

Figure 4:
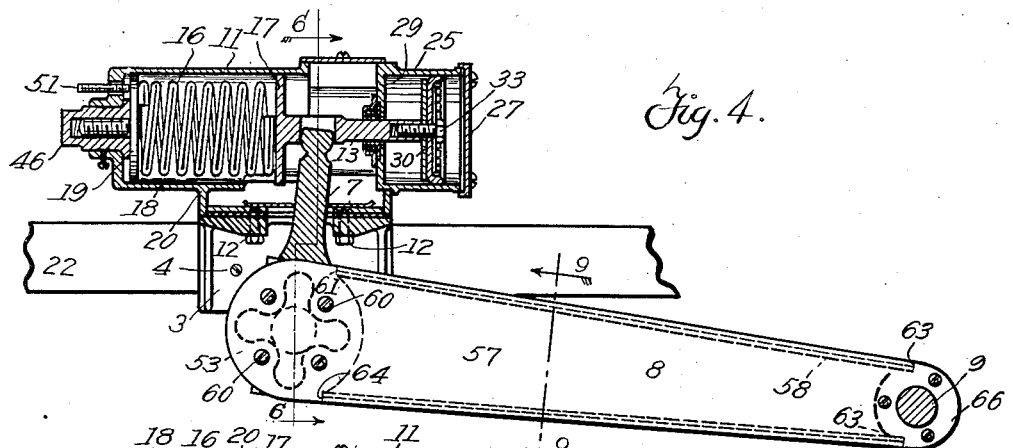
Figure 4 is a side view of the shock absorber partially sectioned vertically-longitudinally, on line 4—4 of Figure 6.
Figure 5:
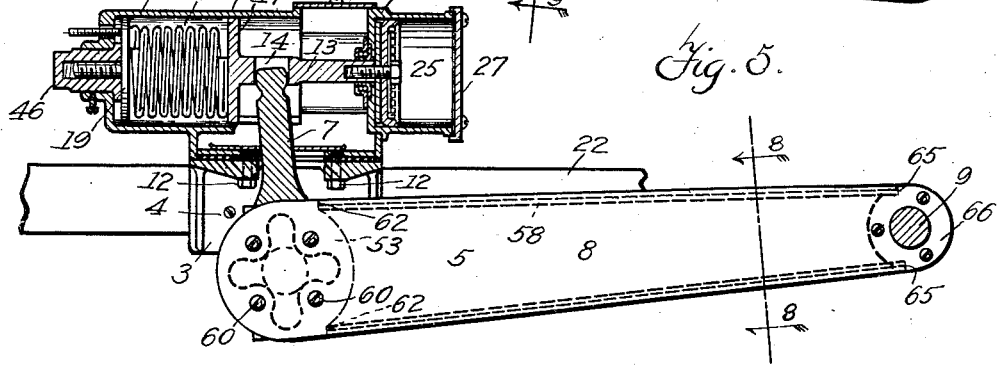
Figure 5 is a like view thereof but showing the parts in another position.

In the embodiment of the invention illustrated by these drawings, a pair of shock absorbers are shown applied at the opposite sides respectively of a vehicle, as the two-wheeled "trailer" 1 adapted to be coupled by its tow bar or tongue 2 to an automobile or the like (not shown) to be drawn thereby.

Each of these shock absorbers comprises a body member or bracket 3 detachably mounted as by bolts or screws 4 on the vehicle at its side and bottom; a lever 5 fulcrumed on said body member having an upwardly extending arm 7 and a rearwardly extending arm 8 provided with an axle spindle 9 on which one of the vehicle's pair of wheels 10 rotates; and the cushioning device designated generally 11 detachably mounted as by bolts or screws 12 on the body member 3.

The particular cushioning device illustrated includes a forwardly-rearwardly slidable piston 13 in whose slot 14 the upper end portion 15 of said arm 7 bears, and suitable means for resiliently yielding resisting the movement of the lever under impacts of the wheel 10 with inequalities of the road.

In this illustrated construction such means includes the helical spring 16 (and as shown in Figure 10 a coaxial helical spring 16¹) pressing between the piston's head portion 17 and the head of a cylinder 18 formed in a hollow block 20, or as shown, the adjustable inner head 19 of said cylinder. The springs 16, 16¹ thus pressing between the piston's head portion 17 and the cylinder's adjustable inner head 19 urge the lever's arm 8 downwardly relatively to the vehicle body 22 so that impacts on the wheel 10 moving said arm upwardly are cushioned by these springs; and they or one of them (as spring 16 as shown in Figure 10) may be connected at its ends, at 23 and 24, with the piston's head portion 17 and the cylinder's adjustable inner head 19 so that the lever is yieldingly held against movement from a middle position in either direction, whereby not only the movement of the lever under such impacts but also its reverse movement or rebound therefrom are thus yieldingly resisted.

As illustrated, a second cylinder 25 axially aligned with cylinder 18 is secured on the block 20 as by bolts 26 extending through the removable outer head 27 of cylinder 25 and threaded in ears 28 of said block. The piston 13 extends through the inner head 29 of cylinder 25 and has the piston head designated generally 30 in said cylinder. This piston head has a loose sliding fit in this cylinder and comprises the disks 31, 32 fastened on the end of the piston by the headed screw bolt 33 passing through said disks and threaded in the central bore 34 of the piston. A flexible packing member 35 of leather or the like having a circular flange 36, and a circular resilient member 37 having spaced teeth 38 pressing said flange in sliding contact with this cylinder's wall, are held between said disks 31, 32. This cylinder thus forms an air chamber in which the piston head 30 reciprocates and whose movement is yieldingly resisted by the air pressure.

It will be seen that the flange 36 of packing member 35 being directed toward the end 27 of cylinder 25 tends, when the piston moves toward said end, to be expanded outwardly into closer and more nearly sealing contact with the cylinder's wall than when the piston moves in the opposite direction wherein the tendency is to move said flange inwardly from said wall. Thus the action of this piston head 30 is to yieldingly resist the movement of the piston toward the right hand side of Figure 10 and to permit its freer movement in the opposite direction, the rebound of the springs 16, 16¹ from their compressed position caused by said impacts being thus cushioned and their movement under such impacts not being affected or resisted (or only comparatively so) by the air cushion in cylinder 25. To effect the same end, an air passage 40 is formed through piston head 30 having a wider outer end 41 and a narrower inner end 42 in that part of the passage which extends through disk 32 as shown in Figure 10 and best seen in Figure 12.

This opening contains a check valve consisting of a flat plate 43 loosely held in the opening by a ring 44 and having air passages 45 in its edge, so that when the piston moves toward the left hand side of Figures 10 and 12 the check valve is moved to its open position and when the piston moves oppositely this valve is closed.

Adjustable means are provided to vary the road clearance or distance between the vehicle body and the rod for any given load or to retain a uniform road clearance for varying loads. In the illustrated construction a specific form of such means is shown, i. e. means for adjusting the tension of the springs 16, 16¹ and thus the action of the shock absorber, to this end the inner head 19 of cylinder 18 is movable to adjusted positions by turning the nut 46 in whose bore 47 is threaded the axial shank portion 48 of said inner head, this nut having an annular flange 49 bearing on the inner side of the fixed outer head 50 of said cylinder.

This inner head 19 has a gage rod 51 extending through an opening 52 in the fixed head 50 and graduated to indicate the adjusted position of said inner head.

Figures 6, 7, 8, 9:
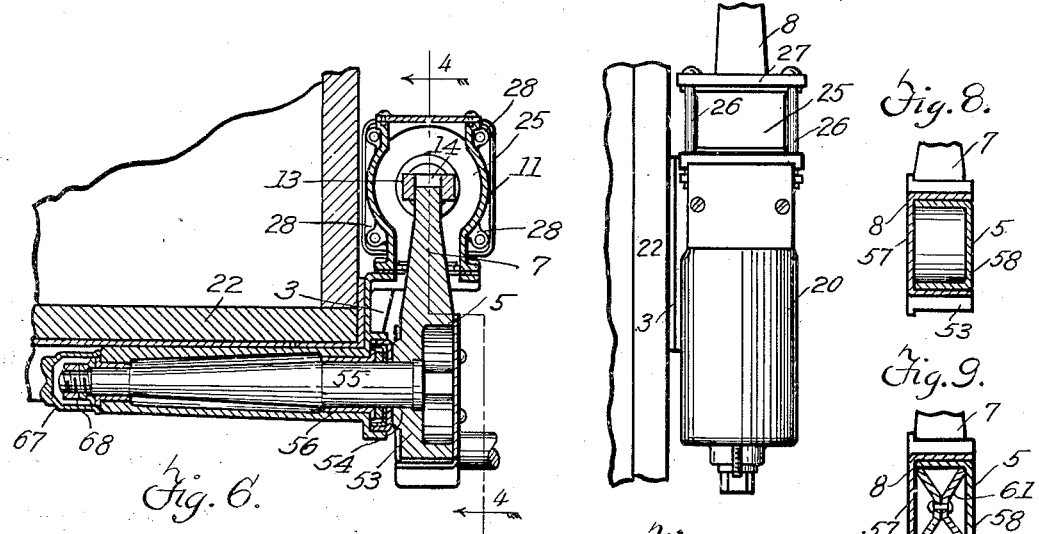
Figure 6 is a vertical-transverse sectional view of the same taken on line 6—6 of Figure 4.
Figure 7 is a top plan view of portions thereof.
Figure 8 is a transverse sectional view of portions of the same taken on line 8—8 of Figure 5.
Figure 9 is a transverse sectional view of portions thereof taken on line 9—9 of Figure 4.

The lever 5 in the illustrated construction comprises a casting 53 of which the arm 7 is a part, its bore 54 containing the headed spindle 55 turnably bearing in the sleeve journal portion 56 of the body member 3 which forms the fulcrum of this lever, whose arm 8 as shown consists of a pair of channel bars 57, 58 held in mutual engagement best seen in Figures 8 and 9 by screws or bolts 60 connecting these bars with the casting 53. An X-shaped strut 61 in this arm 8 strengthens the same against side stresses. The ends 62, 63 of these bars abut on shoulders 64, 65 of said casting and the mounting member 66 of the axle spindle 9 of the vehicle wheel 10.

The sleeve journal portion 56 has a cap 67 and the spindle 55 has a nut 68 holding the same against outwardly axial movement, this journal 56 being adapted to contain lubricant. The space 69 between the cylinders 18 and 25 has a cover 70 and is also adapted to hold lubricant, the opening 71 at its bottom being closed by a slide plate 72 through which the arm 7 extends.

Stuffing boxes or packings are indicated at several places on the drawings.

A cross bar in form a channel bar is shown at 73 to which the tow bar 2 and the sleeve journal portions 56 are connected.

It will be seen that the cushioning or shock-absorbing springs 16, 16¹ are themselves the "vehicle springs" of the vehicle; that the only relative movement of the vehicle body 22 and the vehicle's wheels 10 is in vertical planes parallel with the vehicle's direction of travel; that the side sway or lateral movement of the vehicle body relatively to said wheels (which is so objectionable in those vehicles—especially towed vehicles—in which the body is suspended by shackles or links) is obviated or minimized by my invention; that the axially aligned wheels 10, the shock absorbers and the cushioning means at the opposite sides respectively of the vehicle are independent in structure and in operation, and that the same at either side of the vehicle may be readily removed for replacement or repair without involving the like parts at the vehicle's opposite side.

It will also be seen that this independent mounting of the wheels does away with the necessity of an axle on whose opposite ends the wheels are mounted, thus providing a vehicle body having a low center of gravity.

The invention being intended to be pointed out in the claims, is not to be limited to or by details of construction or arrangement of any particular embodiment thereof illustrated by the drawings or hereinbefore described.

I claim:

1. A shock absorber for vehicles, including: a lever fulcrumed at one side of the vehicle's body on an axis extending horizontally and transversely thereof, having a vertically extending arm and an arm extending horizontally and longitudinally of said body and carrying at its free end one of the vehicle's supporting wheels; a block carried by said body having axially aligned spaced cylinders; a piston extending into the cylinders and engaging the first mentioned arm of the lever therebetween; a cushioning spring in one of the cylinders for yieldingly resisting the relative movement of the lever and said body in one direction; a head of the piston in the other cylinder for yieldingly resisting said relative movement in the opposite direction by air pressure in said other cylinder, the spring and head operating independently of each other in resisting said movements respectively.

2. A shock absorber for vehicles, including: a lever fulcrumed at one side of the vehicle's body on an axis extending horizontally and transversely thereof, having a vertically extending arm and an arm extending horizontally and longitudinally of said body and carrying at its free end one of the vehicle's supporting wheels; a block carried by said body having axially aligned spaced cylinders one of which has an axially adjustable inner head; a piston extending into the cylinders and engaging the first mentioned arm of the lever therebetween; means for adjusting said inner head; a cushioning spring in said cylinder pressing between the piston and said inner head for yieldingly resisting the relative movement of the lever and said body in one direction; a head of the piston in the other cylinder for yieldingly resisting said relative movement in the opposite direction by air pressure in said other cylinder, the spring and head operating independently of each other in resisting said movements respectively.

3. A shock absorber for vehicles, including: a lever fulcrumed at one side of the vehicle's body on an axis extending horizontally and transversely thereof, having a vertically extending arm and an arm extending horizontally and longitudinally of said body and carrying at its free end one of the vehicle's supporting wheels; a block carried by said body having axially aligned spaced cylinders one of which has an axially adjustable inner head; a piston extending into the cylinders and engaging the first mentioned arm of the lever therebetween; means for adjusting said inner head; a cushioning spring in said cylinder pressing between the piston and said inner head for yieldingly resisting the relative movement of the lever and said body in one direction; a head of the piston in the other cylinder for yieldingly resisting said relative movement in the opposite direction by air pressure in said other cylinder, said inner head having a gage rod extending outwardly therefrom having a graduation indicating the adjusted position of said inner head, the spring and head operating independently of each other in resisting said movements respectively.

4. A shock absorber for vehicles, including: a lever fulcrumed at one side of the vehicle's body on an axis extending horizontally and transversely thereof, having a vertically extending arm and an arm extending horizontally and longitudinally of said body and carrying at its free end one of the vehicle's supporting wheels; a block carried by said body having a fluid containing cylinder; a piston engaging the first mentioned arm of the lever and having a piston head in the cylinder comprising a flexible disk member having a peripheral flange slidably contacting the cylinder wall and a disk member having resilient spaced edge portions pressing said flange into contact with the cylinder wall for yieldingly resisting the relative movement of the lever and said body by fluid pressure in the cylinder.

5. A shock absorber for vehicles, including: a lever fulcrumed at one side of the vehicle's body on an axis extending horizontally and transversely thereof, having a vertically extending arm and an arm extending horizontally and longitudinally of said body and carrying at its free end one of the vehicle's supporting wheels; a block carried by said body having a fluid containing cylinder; a piston engaging the first mentioned arm of the lever and having a piston head in the cylinder with a fluid opening through said head; a check valve in the fluid opening consisting of a flat disk having fluid passages through its edge portion said flat disk being movable to a position closing said fluid opening by the piston's movement in one direction and to a position opening said fluid opening by the piston's opposite movement.

6. A shock absorber for vehicles, including: a lever fulcrumed at one side of the vehicle's body on an axis extending horizontally and transversely thereof, having a vertically extending arm and an arm extending horizontally and longitudinally of said body and carrying at its free end one of the vehicle's supporting wheels; a block carried by said body having axially aligned spaced cylinders; a piston extending into the cylinders and engaging the first mentioned arm of the lever therebetween; a cushioning spring in one of the cylinders for yieldingly resisting the relative movement of the lever and said body in one direction; a head of the piston in the other cylinder for yieldingly resisting said relative movement in one direction by air pressure in said other cylinder, the block having a hollow connection between the cylinders adapted to contain lubricant, the spring and head operating independently of each other in resisting said movements respectively.

7. A shock absorber for vehicles, including: a lever comprising a part having a vertically extending lever arm and spindle fulcrumed at one side of the vehicle's body on an axis extending horizontally and transversely thereof and comprising also a lever arm extending horizontally and longitudinally of said body and carrying at its free end one of the vehicle's supporting wheels, said second mentioned lever arm comprising a pair of parallel channel bars with mutually engaging side flanges and middle web portions connected to said part which has the vertically extending lever arm; cushioning means operatively intermediate said body and said vertically extending lever arm for yieldingly resisting the relative movement of the lever and said body.

8. In a vehicle: a vehicle body having on its under side a cross bar and a tow bar connected thereto; a shock absorber including a pair of body members detachably connected with the cross bar at its opposite ends respectively and having fulcrum bearings for the hereinafter mentioned levers, axially extending horizontally and transversely of said body; a pair of levers having spindles turnable in said bearings respectively; a pair of independently acting cushioning means operatively intermediate said body and the levers respectively for yieldingly resisting the relative movement of the respective levers and said body.

9. A shock absorber for vehicles, including: a lever comprising a part having a spindle fulcrumed at one side of the vehicle's body on an axis extending horizontally and transversely of the vehicle, said part having also a radial arm forming one arm of the lever, and a pair of shoulders angularly spaced about said axis, the lever comprising also a part carrying one of the vehicle's supporting wheels and having a pair of shoulders angularly spaced about the wheel's axis of rotation, the lever comprising also a pair of channel bars each having a web portion and side flanges, said bars being fastened adjacent their ends to the said parts of the lever respectively with the ends of the flanges adjacent one end of the bars in abutting engagement with the shoulders respectively of one of said parts and the other ends of the flanges adjacent the opposite end of the bars in abutting engagement with the shoulders respectively of the other one of said parts for additionally holding the bars against turning relatively to said parts, and with the flanges of one of the bars in tightly fitting engagement between the flanges of the other one of the bars; and cushioning means operatively intermediate the vehicle's body and said radial arm for yieldingly resisting the relative movement of the lever and said body.

CHARLES H. KIRBY.